(12) United States Patent
Wang et al.

(10) Patent No.: US 11,393,490 B2
(45) Date of Patent: Jul. 19, 2022

(54) METHOD, APPARATUS, DEVICE AND COMPUTER-READABLE STORAGE MEDIUM FOR VOICE INTERACTION

(71) Applicant: Baidu Online Network Technology (Beijing) Co., Ltd., Beijing (CN)

(72) Inventors: Zhijian Wang, Beijing (CN); Jinfeng Bai, Beijing (CN); Sheng Qian, Beijing (CN); Lei Jia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 58 days.

(21) Appl. No.: 16/895,772

(22) Filed: Jun. 8, 2020

(65) Prior Publication Data
US 2021/0142819 A1 May 13, 2021

(30) Foreign Application Priority Data
Nov. 13, 2019 (CN) .......................... 201911108242.1

(51) Int. Cl.
*G06F 15/00* (2006.01)
*G10L 25/00* (2013.01)
*G10L 25/51* (2013.01)
*G06F 40/279* (2020.01)
*G06F 40/30* (2020.01)
*G10L 15/02* (2006.01)
*G10L 15/18* (2013.01)

(52) U.S. Cl.
CPC ............ *G10L 25/51* (2013.01); *G06F 40/279* (2020.01); *G06F 40/30* (2020.01); *G10L 15/02* (2013.01); *G10L 15/1815* (2013.01)

(58) Field of Classification Search
None
See application file for complete search history.

(56) References Cited

U.S. PATENT DOCUMENTS

| 10,108,606 | B2* | 10/2018 | Yun ......................... G10L 25/75 |
| 2010/0256972 | A1* | 10/2010 | Grenier ................... G06F 40/58 704/E15.001 |
| 2011/0054901 | A1* | 3/2011 | Qin .......................... G06F 40/45 704/E15.005 |
| 2015/0348548 | A1 | 12/2015 | Piernot et al. |

(Continued)

FOREIGN PATENT DOCUMENTS

| CN | 105009203 A | 10/2015 |
| CN | 106782560 A | 5/2017 |

(Continued)

*Primary Examiner* — Satwant K Singh
(74) *Attorney, Agent, or Firm* — Nixon Peabody LLP

(57) ABSTRACT

According to embodiments of the present disclosure, a method, apparatus, device, and computer readable storage medium for voice interaction are provided. The method includes: determining a text corresponding to the voice signal based on a voice feature of a received voice signal. The method further includes: determining, based on the voice feature and the text, a matching degree between a reference voice feature of an element in the text and a target voice feature of the element. The method further includes: determining a first possibility that the voice signal is an executable command based on the text. The method further includes: determining a second possibility that the voice signal is the executable command based on the voice feature.

13 Claims, 5 Drawing Sheets

(56) References Cited

U.S. PATENT DOCUMENTS

2018/0211649 A1\*  7/2018  Li .......................... G10L 13/047
2021/0035558 A1    2/2021  Nakamura et al.

FOREIGN PATENT DOCUMENTS

| | | |
|---|---|---|
| CN | 107207030 A | 9/2017 |
| CN | 107240398 A | 10/2017 |
| CN | 107910003 A | 4/2018 |
| CN | 108320738 A | 7/2018 |
| CN | 108376543 A | 8/2018 |
| CN | 108932945 A | 12/2018 |
| CN | 109427336 A | 3/2019 |
| CN | 109461446 A | 3/2019 |
| CN | 109616126 A | 4/2019 |
| CN | 109686383 A | 4/2019 |
| CN | 110081577 A | 8/2019 |
| CN | 110085224 A | 8/2019 |
| CN | 110148405 A | 8/2019 |
| CN | 110164427 A | 8/2019 |
| CN | 110364143 A | 10/2019 |
| CN | 110377716 A | 10/2019 |
| CN | 110415695 A | 11/2019 |
| JP | 2004-341293 A | 12/2004 |
| JP | 2018136568 A | 8/2018 |
| JP | 2019139000 A | 8/2019 |

\* cited by examiner

METHOD, APPARATUS, DEVICE AND COMPUTER-READABLE STORAGE MEDIUM FOR VOICE INTERACTION

CROSS-REFERENCE TO RELATED APPLICATIONS

This application claims priority to Chinese Patent Application No. 201911108242.1, filed on Nov. 13, 2019, titled "Method, Apparatus, Device and Computer-Readable Storage Medium for Voice Interaction", which is hereby incorporated by reference in its entirety.

TECHNICAL FIELD

Embodiments of the present disclosure mainly relate to the field of artificial intelligence, and more specifically to a method, apparatus, device and computer readable storage medium for voice interaction.

BACKGROUND

Voice interaction technology is a technology by which humans interact with computers through voice to realize a voice interaction experience similar to the natural dialogue. The human-computer interaction was implemented through the interaction of the mouse and keyboard with the screen in the computer era, and has been developed to a direct interaction with the touch screen in the smartphone era. The method of human-computer interaction is getting more and more simple, and the interaction is becoming easier and easier. With the vigorous development of the artificial intelligence and the mobile Internet, the natural voice interaction, which is just like interaction between people, has gradually become a new type of human-computer interaction. The voice interaction also has the advantages of large input bandwidth, high accuracy, good mobility, low usage threshold, etc., and is one of the preferred interaction methods for human-computer interaction.

Human-computer interaction is realized through voice interaction, which improves information processing efficiency. At the same time, this method also makes the interaction between users and machines more convenient. However, there are still many problems to be solved in this interaction process.

SUMMARY

According to an example embodiment of the present disclosure, a scheme for voice interaction is provided.

In a first aspect of the present disclosure, a method for voice interaction is provided. The method comprising: determining, based on a voice feature of a received voice signal, a text corresponding to the voice signal; determining, based on the voice feature and the text, a matching degree between a reference voice feature of an element in the text and a target voice feature of the element; determining, based on the text, a first possibility that the voice signal is an executable command; determining, based on the voice feature, a second possibility that the voice signal is the executable command; and determining, based on the matching degree, the first possibility, and the second possibility, information related to processing of the voice signal.

In a second aspect of the present disclosure, an apparatus for voice interaction is provided. The apparatus comprising: a text determination module, configured to determine, based on a voice feature of a received voice signal, a text corresponding to the voice signal; a first matching degree determination module, configured to determine, based on the voice feature and the text, a matching degree between a reference voice feature of an element in the text and a target voice feature of the element; a first possibility determination module, configured to determine, based on the text, a first possibility that the voice signal is an executable command; a second possibility determination module, configured to determine, based on the voice feature, a second possibility that the voice signal is the executable command; and a first information determination module, configured to determine, based on the matching degree, the first possibility, and the second possibility, information related to processing of the voice signal.

In a third aspect of the present disclosure, an electronic device is provided, comprising: one or more processors; and a storage apparatus, for storing one or more programs, the one or more programs, when executed by the one or more processors, cause the one or more processors to implement the method according to the first aspect of the present disclosure.

In a fourth aspect of the present disclosure, a computer-readable storage medium, storing a computer program thereon, the program, when executed by a processor, implements the method according to the first aspect of the present disclosure.

It is to be understood that what is described in the Summary of the Invention is not intended to limit the critical or critical features of the embodiments of the disclosure, nor is it intended to limit the scope of the disclosure. Other features of the present disclosure will become readily apparent from the following description.

BRIEF DESCRIPTION OF THE DRAWINGS

The above and other features, advantages, and aspects of the embodiments of the present disclosure will become more apparent in conjunction with the accompanying drawings and with reference to the following detailed description. In the accompanying drawings, same or similar reference numerals indicate the same or similar elements, in which.

DETAILED DESCRIPTION OF EMBODIMENTS

Figure 1:
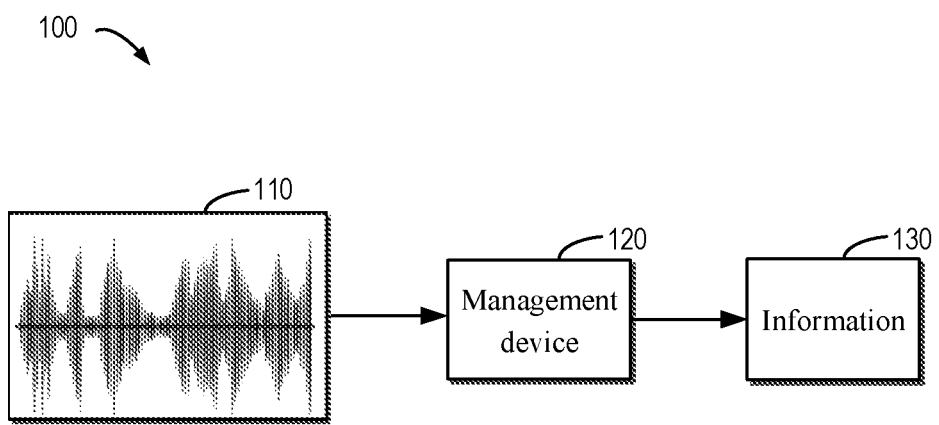
FIG. 1 shows a schematic diagram of an environment 100 in which various embodiments of the present disclosure may be implemented.

Hereinafter, embodiments of the present disclosure will be described in more detail with reference to the accompanying drawings. Although some embodiments of the present disclosure are shown in the accompanying drawings, it should be understood that the present disclosure may be implemented in various forms, and should not be construed as being limited to the embodiments set forth herein. Instead, these embodiments are provided for a more thorough and complete understanding of the present disclosure. It should be understood that the accompanying drawings and embodiments of the present disclosure are for exemplary purposes only, and are not intended to limit the protection scope of the present disclosure.

In the description of the embodiments of the present disclosure, the term "comprising" and its similar terms should be understood as an open inclusion, that is, "including but not limited to." The term "based on" should be understood as "based at least in part on". The term "an embodiment" or "the embodiment" should be understood as "at least one embodiment". The terms "first", "second", etc. may refer to different or the same objects. The following may also include other explicit and implicit definitions.

In the process of implementing voice interaction, it is basically adopted that one interaction is performed by one waking up. This interaction method combines the wake-up word detection technology and the product strategy, and is characterized in that: whenever a user articulates a wake-up word for activating the device, a wake-up word detection module built in the device may detect the wake-up word signal and start recognition listening. When the end point of the voice is detected or a preset duration is reached, the listening ends, and voice received in the process is recognized, so as to achieve the process of responding to the user's demand.

However, there are many problems in the above method by which one interaction is performed by one waking up. First, every time the user interacts with the device, the wake-up word is required, which makes each interaction quite complicated. Secondly, if the user does not speak to the device after the device is awakened, it may cause the device to respond incorrectly. At the same time, when a false wake-up occurs, if the false wake-up occurs at an inappropriate time, such as rest time at night, the user experience may be very poor.

According to the embodiments of the present disclosure, an improved solution for voice interaction is proposed. In this solution, a text corresponding to the voice signal is determined based on a voice feature of a received voice signal. Then, based on the voice feature and the determined text, a matching degree between a reference voice feature of an element in the text and a voice feature of the element is determined. The solution further respectively determines a first possibility and a second possibility of the voice signal being an executable command based on the text and the voice feature. Then, based on the matching degree, the first possibility and the second possibility, information related to processing of the voice signal is determined. Using this method, it maybe determined from a plurality of dimensions whether the voice interaction device should respond to an obtained sound signal, and how to respond to the sound signal, thereby realizing more accurate and intelligent voice interaction control and improving user experience.

FIG. 1 shows a schematic diagram of an environment 100 in which various embodiments of the present disclosure can be implemented. In this example environment 100, when human-computer interaction is performed, an obtained voice signal 110 is sent to a management device 120.

The voice signal 110 may be obtained by any voice interaction device that performs user interaction. In some embodiments, when the user speaks to the voice interaction device, the voice 110 may be obtained. In some embodiments, if the voice interaction device exists around the user, the voice interaction device may obtain the voice signal 110 when the user interacts with other people. In some embodiments, the voice signal 110 may also be some other sound signal received by the voice interaction device, such as voice in a television. In some embodiments, the voice signal 110 is obtained by a voice interaction device that performs a plurality of interactions with one wake-up. The above example is only to describe the present disclosure, not to specifically limit the present disclosure.

The voice interaction device may have an associated sound collector (for example, one or more microphones) to collect the user's voice instruction. The voice interaction device may also have an associated sound player (for example, one or more speakers) to play sound.

The voice interaction device may be any electronic device capable of controlling and/or interacting through voice signals. Some examples of the voice interaction device may include, but are not limited to: smart speakers, voice interaction TV boxes, smart home appliances, voice tutors, smart robots, map navigation devices, smart wearable devices, and the like. The voice interaction device may also be any other electronic device installed with a voice interaction application, such as a voice assistant application, a smart car machine system, an information search application, a map application, a social platform application, an audio and video playback application, or a smart assistant application, examples of the electronic device that can install such voice interaction applications may be, but are not limited to, smart phones, multimedia computers, multimedia tablets, Internet nodes, communicators, desktop computers, laptop computers, notebook computers, netbook computers, tablet computers, personal navigation devices, personal digital assistants (PDAs), audio/video players, digital cameras/camcorders, positioning devices, e-book devices, game devices, or any combination of the foregoing.

For example, in the case where the voice interaction device is a smart speaker, a voice instruction may be "play the song xxx of the singer xxx", etc., after the voice signal is correctly recognized, the voice interaction device may search for the corresponding song and play it to the user.

During the interaction process with the voice interaction device, it is usually necessary to wake up the voice interaction device to enter an interaction status by using the wake-up word. The voice interaction device may support a plurality of interactions with one wake-up. In a scenario of a plurality of interactions with one wake-up, after the voice interaction device is awakened, as long as the device is in an operating status, for example, making a sound and the like, the user does not need to say the wake-up word again, but may directly interact with the voice interaction device. This lowers the interaction threshold and increases the user's willingness to interact. In some embodiments, if the interaction belongs to a query category, such as querying the weather, within a period of time (for example, one day) after the voice interaction device finishes answering, the user does not need to wake up the device again to continue the interaction.

The voice signal 110 is transmitted to the management device 120 for processing. Based on the received voice signal 110, the management device 120 determines whether the voice signal 110 is a command issued by the user to be used to cause the voice interaction device to execute. If so, the management device 120 sends information 130 including an execution instruction or information 130 including content to be obtained to the voice interaction device for processing.

In some embodiments, the management device 120 is a computing device located in the cloud, which is used to process voice data uploaded by the voice interaction device. In some embodiments, the management device 120 and the voice interaction device are the same device. Therefore, the voice signal 110 may also be processed by the voice interaction device that receives the voice signal 110. The voice interaction device directly recognizes whether the voice signal 110 is to execute the command. In some embodiments, the management device 120 includes, but is not limited to, a personal computer, a server computer, a handheld or laptop device, a mobile device (such as a mobile phone, a personal digital assistant (PDA), or a media player), a multi-processor system, a consumer electronics product, a small computer, a mainframe computer, and a distributed computing environment including any of the above systems or devices, etc.

It should be understood that the environment shown in FIG. 1 is merely exemplary and does not specifically limit the present disclosure.

FIG. 1 above shows a schematic diagram of an environment 100 in which various embodiments of the present disclosure can be implemented. The following describes a flowchart of a method 200 for voice interaction according to some embodiments of the present disclosure in conjunction with FIG. 2. The method 200 may be implemented by the management device 120 in FIG. 1 or any other suitable device.

At block 202, the management device 120 determines a text corresponding to the voice signal 110 based on a voice feature of the received voice signal 110. The management device 120 performs voice recognition processing on the received voice signal 110 using a voice recognizer. Through the voice recognizer, the received voice signal 110 may be recognized as the text corresponding to the voice signal 110. In some embodiments, the voice signal 110 may include various voice features, such as but not limited to voiceprint feature, intonation feature, or other suitable features for describing voice. It should be understood that the above examples of the voice feature are only for describing the embodiments of the present disclosure, rather than specifically limiting the present disclosure.

The management device 120 receives the voice signal 110. In some embodiments, when the management device 120 is a device that processes the voice signal 110, the management device 120 is used to receive the voice signal 110 uploaded in real time by the voice interaction device. In some embodiments, the management device 120 and the voice interaction device are the same device for processing directly on the voice interaction device.

The management device 120 also extracts the voice feature from the received voice signal 110 using the voice recognizer. When generating the text corresponding to the voice signal 110, the voice recognizer also needs to extract voice feature. In some embodiments, the voice feature is a Mel frequency cepstral coefficient MFCC feature. The above examples are only for describing the present disclosure, rather than specifically limiting the present disclosure. Those skilled in the art may set the voice feature to be represented by any suitable parameter as needed.

At block 204, the management device 120 determines, based on the voice feature and the text, a matching degree between a reference voice feature of an element in the text and a target voice feature of the element in the voice feature. In some embodiments, the element refers to a word in the text. In some embodiments, the element refers to a syllable in the text.

In some embodiments, the element refers to a letter in the text. The above examples are only for describing the present disclosure, rather than specifically limiting the present disclosure.

In some embodiments, the management device 120 determines the reference voice feature corresponding to the element in the text from the voice feature. An alignment recognizer in the management device 120 uses the recognized text to determine the voice feature corresponding to each element in the text.

In determining the voice feature corresponding to each element, the alignment recognizer obtains a standard voice feature corresponding to each element. Then, the obtained reference voice feature is compared with the voice feature to determine the start time and end time of the target voice feature corresponding to each element. Therefore, the alignment recognizer may obtain the target voice feature of a predetermined duration determined by the start time and the end time corresponding to the element in the text.

The management device 120 determines the matching degree between the reference voice feature and the target voice feature based on the reference voice feature and the target voice feature for the element.

After obtaining the target voice feature for each element, the management device 120 inputs the target voice feature and the reference voice feature into a trained neural network model to determine the matching degree between the reference voice feature and the target voice feature. In some embodiments, if the target voice feature matches the reference voice feature to a high degree, it indicates that the recognized word is accurate. If the matching degree is low, it indicates that the recognized word is inaccurate. Then, based on the matching degree for each element, the matching degree for all the elements in the obtained text is determined. In one embodiment, the matching degree for all the elements may be determined by summing the matching degree for each element and then averaging.

At block 206, the management device 120 determines a first possibility that the voice signal 110 is an executable command based on the text. The management device 120 determines whether the received voice signal 110 is a voice signal to interact with the voice interaction device based on the entire text.

The process of determining that the voice signal is an executable command through the text is also implemented through the trained neural network model. The neural network model may be a neural network NN, a convolutional neural network CNN or a recurrent neural network RNN, or the like.

When training the neural network model, the text of the voice invoice interaction with the voice interaction device is used as a positive sample, and the text of the voice that is not in voice interaction with the voice interaction device is used as a negative sample for training. Therefore, by inputting a text into the trained neural network, a confidence value of the interaction between the voice signal and the voice interaction device may be determined, that is, the first possibility. In some embodiments, the value of the first possibility is between 0 and 1.

At block 208, the management device 120 determines a second possibility that the voice signal 110 is the executable command based on the voice feature.

The process of determining that the voice signal 110 is the executable command using the voice feature is also implemented through the trained neural network model. The neural network model may also be a neural network NN, a convolutional neural network CNN or a recurrent neural network RNN, or the like. In some embodiments, the used voice feature is a Mel frequency cepstral coefficient MFCC feature.

When training the neural network model, the voice feature of the voice in voice interaction with the voice interaction device is used as a positive sample, and the voice feature of the voice that is not in voice interaction with the voice interaction device is used as a negative sample for training. Therefore, by inputting a voice feature into the trained neural network, a confidence value of the interaction between the voice signal and the voice interaction device may be determined, that is, the second possibility.

At block 210, the management device 120 determines the information 130 related to processing of the voice signal 110, based on the matching degree, the first possibility, and the second possibility.

The management device 120 performs fusion processing on the obtained matching degree, the first possibility, and the second possibility for the text element to determine whether the voice signal 110 is a voice signal that interacts with the voice interaction device. The process of determining the information related to the processing of the voice signal 110 based on the matching degree, the first possibility, and the second possibility will be described in detail below in conjunction with FIG. 3.

Using this method, it may be determined from a plurality of dimensions whether the voice interaction device should respond to an obtained sound signal, and how to respond to the sound signal, thereby realizing more accurate and intelligent voice interaction control and improving user experience.

Figure 2:
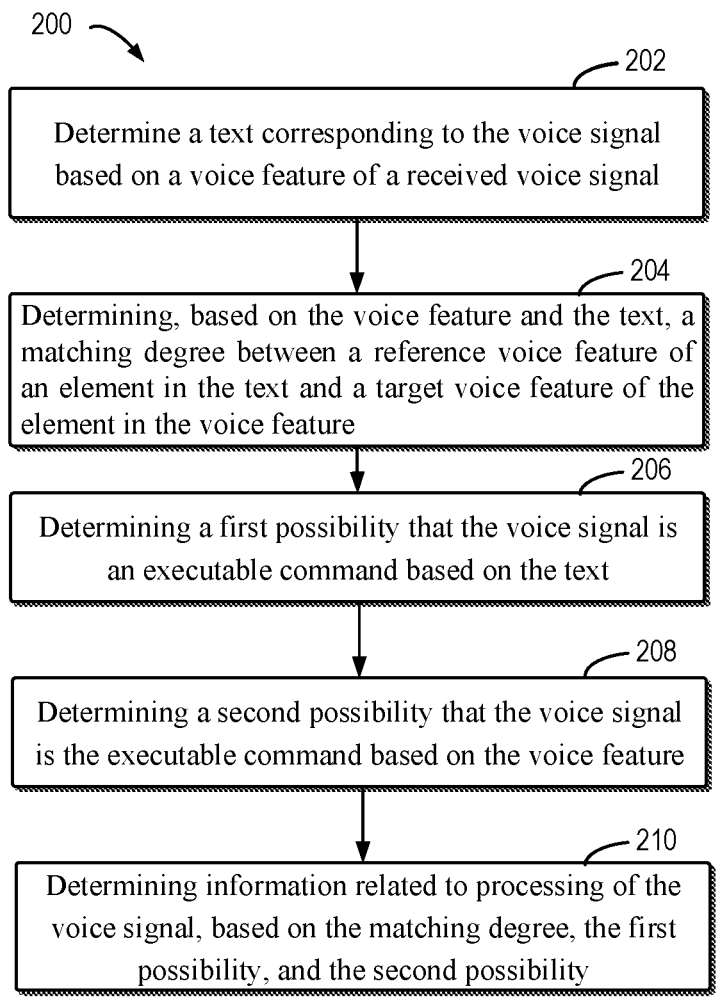
FIG. 2 shows a flowchart of a method 200 for voice interaction according to some embodiments of the present disclosure.
Figure 3:
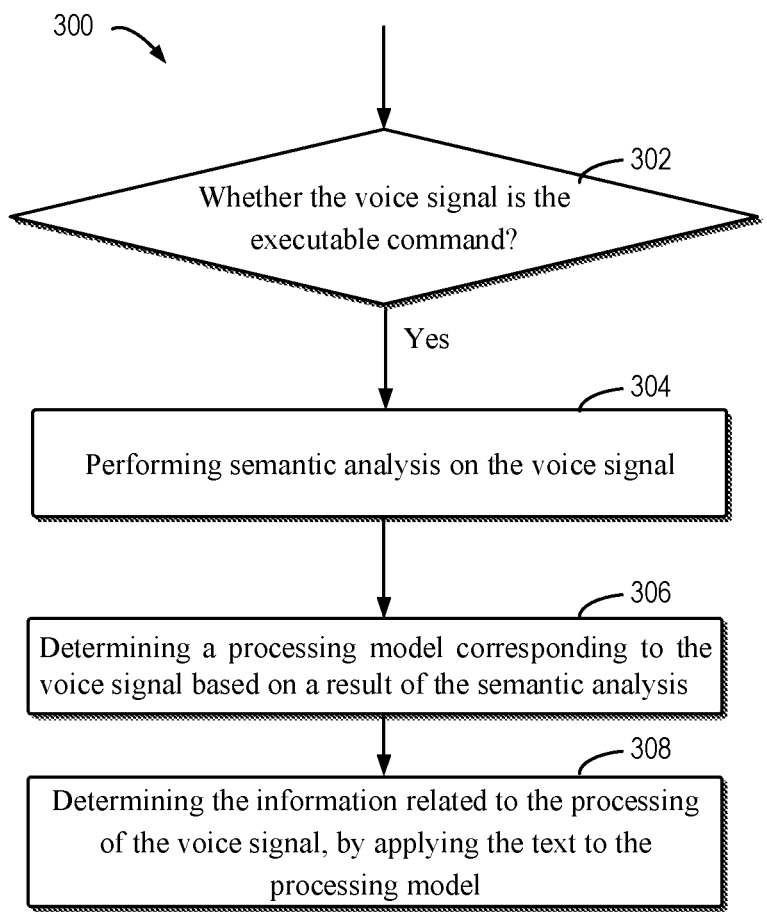
FIG. 3 shows a flowchart of a method 300 for voice interaction according to some embodiments of the present disclosure.

The flowchart of the method 200 for voice interaction according to some embodiments of the present disclosure is described above in conjunction with FIG. 2. The process of determining the information related to the processing of the voice signal at block 210 in FIG. 2 is described in detail below in conjunction with FIG. 3. FIG. 3 shows a flowchart of a method 300 for voice interaction according to some embodiments of the present disclosure. The method 300 in FIG. 3 may be performed by the management device 120 in FIG. 1 or any other suitable device.

At block 302, the management device 120 determines whether the voice signal 110 is the executable command based on the matching degree, the first possibility, and the second possibility. When obtaining the matching degree, the first possibility, and the second possibility, the management device 120 may also obtain a first threshold for the matching degree, a second threshold for the first possibility, and a third threshold for the second possibility. In one embodiment, the first threshold is set to 0.5, the second threshold is set to 0.3, and the third threshold is set to 0.8.

In some embodiments, when the matching degree is greater than the first threshold, the first possibility is greater than the second threshold, and the second possibility is greater than the third threshold, the voice signal 110 is determined as the executable command, that is, the voice signal 110 is determined to interact with the voice interaction device.

In some embodiments, when the value of two of the matching degree, the first possibility, and the second possibility is greater than the corresponding threshold, and is higher than the threshold by a predetermined ratio (for example, 20% higher than the threshold), the voice signal 110 is determined as the executable command, that is, the voice signal 110 is determined to interact with the voice interaction device.

If it is determined that the voice signal 110 is not the executable command, that is, it is determined that the voice signal 110 is not interacting with the voice interaction device, then the voice signal 110 is no longer processed.

After determining that the voice signal 110 is the executable command, at block 304, the management device 120 performs semantic analysis on the voice signal 110. When it is determined that the voice signal 110 is used for interaction with the voice interaction device, the voice signal 110 needs to be further processed.

At block 306, the management device 120 determines a processing model corresponding to the voice signal 110 based on a result of the semantic analysis.

In one embodiment, the management device 120 determines a field related to the text, based on the result of the semantic analysis. In some embodiments, the process of determining the field related to the text is also implemented through the trained neural network model. When training the neural network model, a predetermined text and its corresponding field are used for training. After the neural network model is trained, the text may be input into the neural network model to directly obtain the field corresponding to the text.

The management device 120 selects the processing model for the field from a set of candidate models. After determining the field of the text, the management device 120 selects the model corresponding to the field from a set of candidate models. In some embodiments, the model is also the neural network model. When training the model, the text determined based on the semantics that needs to execute the command is determined as a positive sample, and the text determined based on the semantics that does not need to execute the command is determined as a negative sample.

At block 308, the management device 120 determines the information 130 related to the processing of the voice signal 110, by applying the text to the processing model, the information 130 indicating whether the voice signal 110 is to be processed.

When inputting the text into the neural network model, it is possible to determine based on the semantics whether the text is a command that needs to be executed. In one embodiment, the value is between 0-1. Probability close to 1 indicates an executable command, and close to 0 indicates that the command is not an executable command.

A predetermined threshold may be set as needed to determine whether it is a command to be executed. If it is a command to be processed, a corresponding action is executed. If it is not a command to be executed, no operation is performed.

Using the above method, it is possible to determine whether an action is to be executed based on the semantics after determining whether a voice is the voice interacting with the voice interaction device. It may improve the accuracy of voice command execution during voice interaction, ensure that no voice command is executed by mistake, and improve the user experience.

Figure 4:
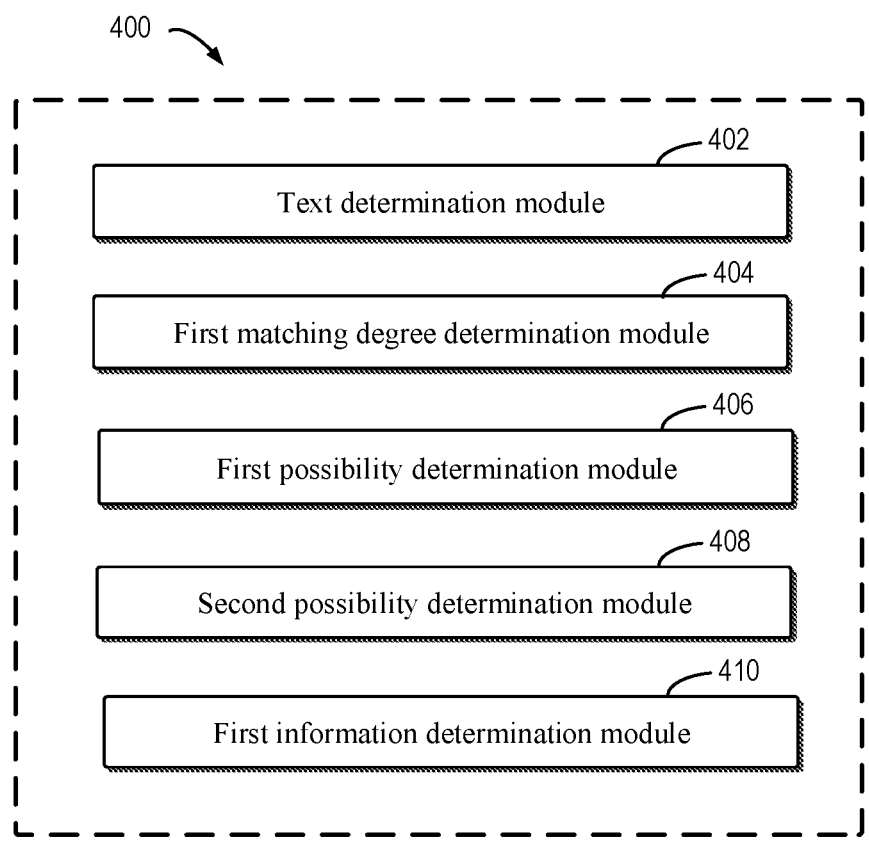
FIG. 4 shows a block diagram of an apparatus 400 for voice interaction according to some embodiments of the present disclosure.

FIG. 4 shows a schematic block diagram of an apparatus 400 for voice interaction according to an embodiment of the present disclosure. As shown in FIG. 4, the apparatus 400 may include a text 402, configured to determine a text corresponding to the voice signal based on a voice feature of a received voice signal. The apparatus 400 may further include a first matching degree determination module 404, configured to determine, based on the voice feature and the text, a matching degree between a reference voice feature of an element in the text and a target voice feature of the element in the voice feature. The apparatus 400 may further include a first possibility determination module 406, configured to determine a first possibility that the voice signal is an executable command based on the text. The apparatus 400 may further include a second possibility determination module 408, configured to determine a second possibility that the voice signal is the executable command based on the voice feature. The apparatus 400 may further include a first information determination module 410, configured to determine information related to processing of the voice signal, based on the matching degree, the first possibility, and the second possibility.

In some embodiments, the first matching degree determination module 404 includes a reference voice feature determination module, configured to determine the reference voice feature corresponding to the element in the text from the voice feature; and a second matching degree determination module, configured to determine the matching degree between the reference voice feature and the target voice feature, based on the reference voice feature and the target voice feature of the element.

In some embodiments, the first information determination module 410 includes a first executable command determination module, configured to determine whether the voice signal is the executable command based on the matching degree, the first possibility, and the second possibility; a semantic analysis module, configured to perform semantic analysis on the voice signal, in response to determining that the voice signal is the executable command; a first processing model determination module, configured to determine a processing model corresponding to the voice signal based on a result of the semantic analysis; and a second information determination module, configured to determine the information related to the processing of the voice signal, by applying the text to the processing model, the information indicating whether the voice signal is to be processed.

In some embodiments, the first executable command determination module includes a second executable command determination module, configured to determine the voice signal as the executable command, in response to the matching degree being greater than a first threshold, the first possibility being greater than a second threshold, and the second possibility being greater than a third threshold.

In some embodiments, the first processing model determination module includes a field determination module, configured to determine a field related to the text, based on the result of the semantic analysis; and a second processing model determination module, configured to select the processing model for the field from a set of candidate models.

In some embodiments, the apparatus 400 for voice interaction further includes a receiving apparatus, configured to receive the voice signal; and an extraction apparatus, configured to extract the voice feature from the received voice signal.

Figure 5:
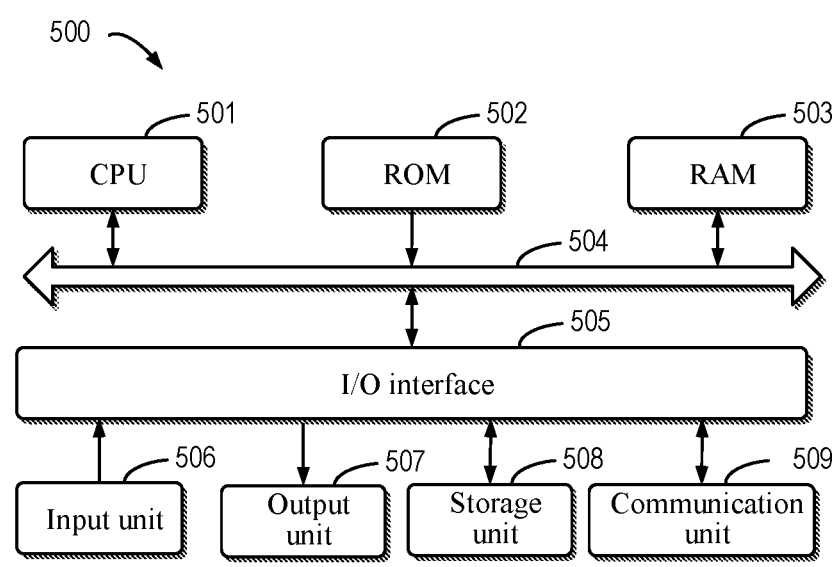
FIG. 5 shows a block diagram of a device 500 capable of implementing various embodiments of the present disclosure.

FIG. 5 shows a schematic block diagram of an electronic device 500 that may be used to implement the embodiments of the present disclosure. The device 500 may be used to implement the management device 120 in FIG. 1. As shown in the figure, the device 500 includes a computing unit 501, which may execute various appropriate actions and processes in accordance with a computer program instruction stored in a read-only memory (ROM) 502 or a computer program instruction loaded into a random access memory (RAM) 503 from a storage unit 508. The RAM 503 also stores various programs and data required by operations of the device 500. The computing unit 501, the ROM 502 and the RAM 503 are connected to each other through a bus 504. An input/output (I/O) interface 505 is also connected to the bus 504.

Various components in the device 500 are connected to the I/O interface 505, including: an input unit 506, such as a keyboard, or a mouse; an output unit 507, such as various types of displays, or speakers; the storage unit 508, such as a magnetic disk , or an optical disc; and a communication unit 509, such as s network card, a modem, or a wireless communication transceiver. The communication unit 509 allows the device 500 to exchange information/data with other devices through a computer network such as the Internet and/or various telecommunication networks.

The computing unit 501 may be various general-purpose and/or dedicated processing components having processing and computing capabilities. Some examples of the computing unit 501 include, but are not limited to, central processing unit (CPU), graphics processing unit (GPU), various dedicated artificial intelligence (AI) computing chips, various computing units running machine learning model algorithms, digital signal processor (DSP), and any suitable processor, controller, microcontroller, etc. The computing unit 501 performs various methods and processes described above, such as the method 200 and the method 300. For example, in some embodiments, the method 200 and the method 300 maybe implemented as a computer software program, which is tangibly contained on a machine-readable medium, such as the storage unit 508. In some embodiments, part or all of the computer program may be loaded and/or installed on the device 500 via the ROM 502 and/or the communication unit 509. When the computer program is loaded into the RAM 503 and executed by the computing unit 501, one or more steps of the method 200 and the method 300 described above maybe performed. Alternatively, in other embodiments, the computing unit 501 may be configured to perform the method 500 by any other suitable means (e.g., by means of firmware).

The functions described herein above maybe performed at least in part by one or more hardware logic components. For example, without limitation, exemplary types of hardware logic components that may be used include: field programmable gate array (FPGA), application specific integrated circuit (ASIC), application specific standard product (ASSP), system on chip system (SOC), load programmable logic device (CPLD), etc.

The program codes for implementing the method of the present disclosure may be written in any combination of one or more programming languages. These program codes maybe provided to a processor or controller of a general-purpose computer, dedicated computer, or other programmable data processing apparatus, so that the program codes, when executed by the processor or controller, cause the functions/operations specified in the flowcharts and/or block diagrams to be implemented. The program codes may be executed entirely on the machine, partly on the machine, partly on the machine as an independent software package and partly on a remote machine or entirely on a remote machine or server.

In the context of the present disclosure, the machine readable medium may be a tangible medium, which may contain or store a program for use by or in connection with an instruction execution system, apparatus, or device. The machine readable medium may be a machine readable signal medium or a machine readable storage medium. The machine readable medium may include, but is not limited to, electronic, magnetic, optical, electromagnetic, infrared, or semiconductor systems, apparatuses, or devices, or any suitable combination of the foregoing. More specific examples of the machine readable storage medium may include electrical connections based on one or more wires, portable computer disks, hard disks, random access memory (RAM), read only memory (ROM), erasable programmable read-only memory (EPROM or flash memory), optical fibers, portable compact disk read-only memory (CD-ROM), optical storage devices, magnetic storage devices, or any suitable combination of the foregoing.

In addition, although the operations are depicted in a specific order, this should be understood as requiring such operations to be performed in the specific order shown or in sequential order, or requiring that all illustrated operations should be performed to achieve desired results. Under certain circumstances, multitasking and parallel processing may be advantageous. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations separately or in any suitable sub-combination.

Although the subject matter has been described in language specific to structural features and/or methodological logical actions, it is to be understood that the subject matter defined in the appended claims is not necessarily limited to the specific features or actions described above. Rather, the specific features and actions described above are merely exemplary forms of implementing the claims.

What is claimed is:

1. A method for voice interaction, comprising:
   determining, based on a voice feature of a received voice signal, a text corresponding to the voice signal;
   determining, based on the voice feature and the determined text, a matching degree between a reference voice feature of an element in the text and a target voice feature of the element in the voice feature;
   determining, based on the text, a first possibility that the voice signal is an executable command;
   determining, based on the voice feature, a second possibility that the voice signal is the executable command; and
   determining, based on the matching degree, the first possibility, and the second possibility, whether the voice signal is the executable command;
   performing semantic analysis on the voice signal, in response to determining that the voice signal is the executable command;
   determining a processing model corresponding to the voice signal based on a result of the semantic analysis; and
   determining the information related to the processing of the voice signal, by applying the text to the processing model, wherein the information indicates whether the voice signal is to be processed.

2. The method according to claim 1, wherein determining the matching degree comprises:
   determining, from the voice feature, the reference voice feature corresponding to the element in the text; and
   determining the matching degree based on the reference voice feature and the target voice feature of the element.

3. The method according to claim 1, wherein determining whether the voice signal is the executable command comprises:
   determining the voice signal as the executable command, in response to the matching degree being greater than a first threshold, the first possibility being greater than a second threshold, and the second possibility being greater than a third threshold.

4. The method according to claim 1, wherein determining a processing model corresponding to the voice signal comprises:
   determining a field related to the text, based on the result of the semantic analysis; and
   selecting, from a set of candidate models, the processing model for the field.

5. The method according to claim 1, further comprising:
   receiving the voice signal; and
   extracting the voice feature from the received voice signal.

6. The method according to claim 1, wherein the voice feature comprises a voiceprint feature.

7. An apparatus for voice interaction, comprising:
   one or more processors; and
   a storage apparatus, for storing one or more programs, the one or more programs, when executed by the one or more processors, cause the one or more processors to:
   determine, based on a voice feature of a received voice signal, a text corresponding to the voice signal;
   determine, based on the voice feature and the text, a matching degree between a reference voice feature of an element in the text and a target voice feature of the element in the voice feature;
   determine, based on the text, a first possibility that the voice signal is an executable command;
   determine, based on the voice feature, a second possibility that the voice signal is the executable command; and
   determine, based on the matching degree, the first possibility, and the second possibility, whether the voice signal is the executable command;
   perform semantic analysis on the voice signal, in response to determining that the voice signal is the executable command;
   determine a processing model corresponding to the voice signal based on a result of the semantic analysis; and
   determine the information related to the processing of the voice signal, by applying the text to the processing model, wherein the information indicates whether the voice signal is to be processed.

8. The apparatus according to claim 7, wherein the programs, when executed by the one or more processors, cause the one or more processors to:
   determine, from the voice feature, the reference voice feature corresponding to the element in the text; and
   determine the matching degree based on the reference voice feature and the target voice feature of the element.

9. The apparatus according to claim 7, wherein the programs, when executed by the one or more processors, cause the one or more processors to
   determine the voice signal as the executable command, in response to the matching degree being greater than a first threshold, the first possibility being greater than a second threshold, and the second possibility being greater than a third threshold.

10. The apparatus according to claim 7, wherein the programs, when executed by the one or more processors, cause the one or more processors to:
    determine a field related to the text, based on the result of the semantic analysis; and
    select, from a set of candidate models, the processing model for the field.

11. The apparatus according to claim 7, wherein the programs, when executed by the one or more processors, cause the one or more processors to receive the voice signal; and extract the voice feature from the received voice signal.

12. The apparatus according to claim 7, wherein the voice feature comprises a voiceprint feature.

13. A non-transitory computer-readable storage medium, storing a computer program thereon, the program, when executed by a processor, implements a method comprising:

determining, based on a voice feature of a received voice signal, a text corresponding to the voice signal;

determining, based on the voice feature and the determined text, a matching degree between a reference voice feature of an element in the text and a target voice feature of the element in the voice feature;

determining, based on the text, a first possibility that the voice signal is an executable command;

determining, based on the voice feature, a second possibility that the voice signal is the executable command; and determining, based on the matching degree, the first possibility, and the second possibility, whether the voice signal is the executable command;

performing semantic analysis on the voice signal, in response to determining that the voice signal is the executable command;

determining a processing model corresponding to the voice signal based on a result of the semantic analysis; and determining the information related to the processing of the voice signal, by applying the text to the processing model, wherein the information indicates whether the voice signal is to be processed.

* * * * *